(12) United States Patent
Wang He

(10) Patent No.: US 9,046,636 B2
(45) Date of Patent: Jun. 2, 2015

(54) LIGHT GUIDING ELEMENT AND BACKLIGHT MODULE

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 162 days.

(21) Appl. No.: 13/832,026

(22) Filed: Mar. 15, 2013

(65) Prior Publication Data

US 2014/0140044 A1  May 22, 2014

(30) Foreign Application Priority Data

Nov. 16, 2012 (TW) .............................. 101142999 A

(51) Int. Cl.
*F21V 8/00* (2006.01)

(52) U.S. Cl.
CPC ............ *G02B 6/0096* (2013.01); *G02B 6/0028* (2013.01)

(58) Field of Classification Search
CPC ............. G02B 6/00001; G02B 17/004; G02B 2006/00; G02B 6/0096
USPC .......................................... 362/551, 555, 246
See application file for complete search history.

(56) References Cited

U.S. PATENT DOCUMENTS

| | | | | |
|---|---|---|---|---|
| 7,845,833 B2 * | 12/2010 | Warnecke | ...................... | 362/321 |
| 8,740,434 B2 * | 6/2014 | Cho | ................. | 362/555 |
| 8,911,133 B2 * | 12/2014 | Sato et al. | ..................... | 362/607 |
| 2012/0057350 A1 * | 3/2012 | Freier et al. | ................... | 362/279 |

* cited by examiner

*Primary Examiner* — Ali Alavi
(74) *Attorney, Agent, or Firm* — Novak Druce Connolly Bove + Quigg LLP

(57) ABSTRACT

A light guide element includes a hollow housing defining a cavity and a reflective film. The housing includes a front wall with an opening, a closed rear wall opposite to the front wall, and four sidewalls interconnected between the front wall and the rear wall. One of the sidewalls defines a number of light output holes. The opening and the light output holes communicate with the cavity. The reflective film is formed on the entirely inner side surfaces of the housing in the cavity. Light from the opening is repeatedly reflected by the reflective film in the cavity and finally exits the housing through the light input holes.

10 Claims, 1 Drawing Sheet

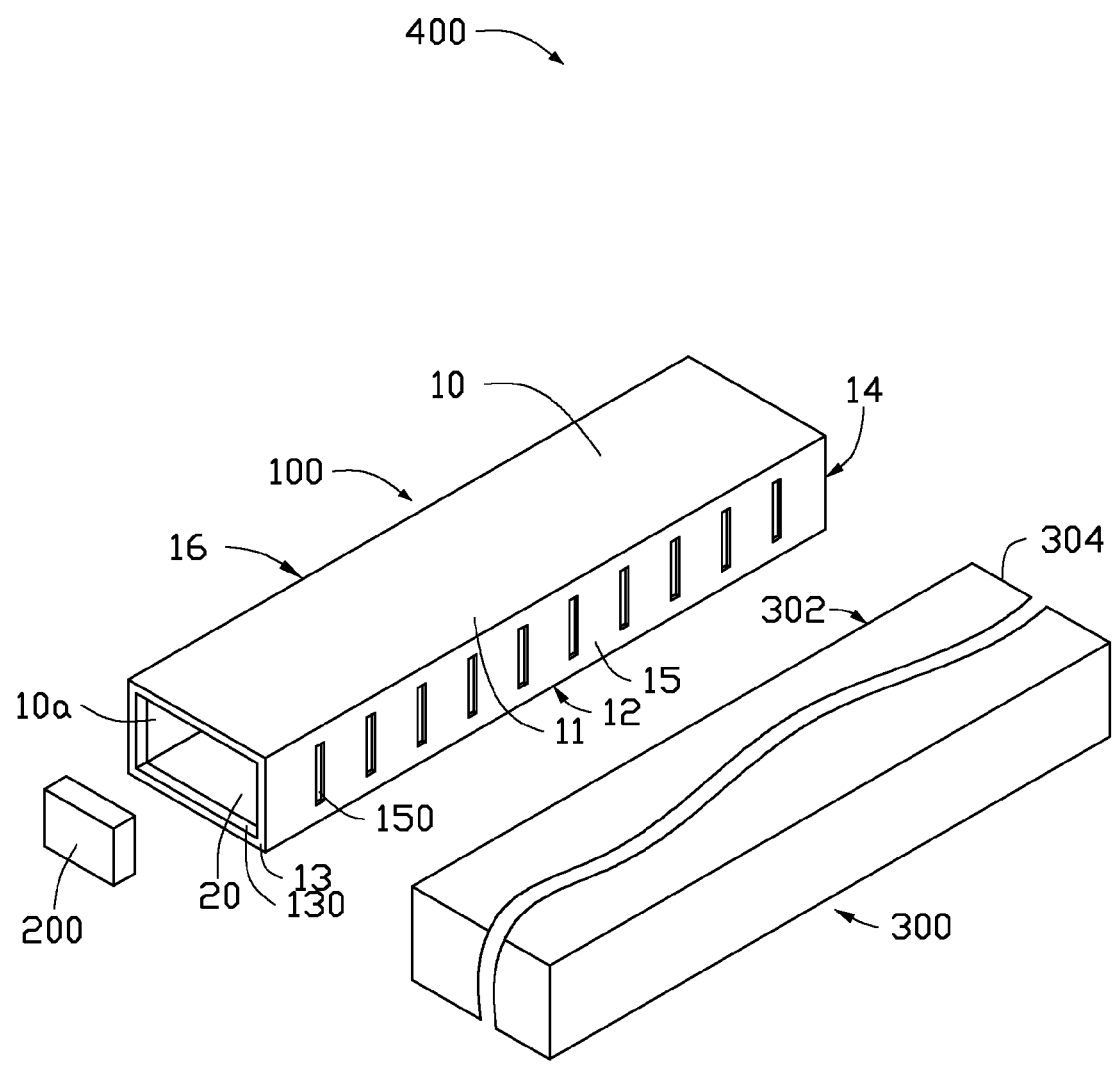

LIGHT GUIDING ELEMENT AND BACKLIGHT MODULE

BACKGROUND

1. Technical Field

The present disclosure relates to optic technologies and, particularly, to a light guiding element and a backlight module using the light guiding element.

2. Description of Related Art

A backlight module is widely used to convert a point light source, such as a light emitting diode (LED), into an area light source having high uniformity and brightness. However, the larger the light emitting area of the backlight module, the more LEDs needed as point light sources. The cost is increased accordingly.

Therefore, it is desirable to provide a light guiding element and a backlight module having the light guiding element, which can overcome or at least alleviate the above-mentioned problems.

BRIEF DESCRIPTION OF THE DRAWINGS

The FIGURE is a schematic view of a backlight module, according to an exemplary embodiment.

DETAILED DESCRIPTION

Referring to the FIGURE, a backlight module 400, according to an exemplary embodiment, includes a light guide element 100, a light source 200, and a light guide plate 300.

The light guide element 100 includes a hollow housing 10 and a reflective film 20. The housing 10 is substantially cube shaped and includes a first sidewall 11, a second sidewall 12, a front wall 13, a rear wall 14, a third sidewall 15, and a fourth sidewall 16. The first sidewall 11 and the second sidewall 12 are positioned at opposite sides of the housing 10, and the first sidewall 11 is parallel to the second sidewall 12. The front wall 13 and the rear wall 14 are positioned at opposite sides of the housing 10, and the front wall 13 is parallel to the rear wall 14. The third sidewall 15 and the fourth sidewall 16 are positioned at opposite sides of the housing 10, and the third sidewall 15 is parallel to the fourth sidewall 16. The first sidewall 11, the third sidewall 15, the second sidewall 12, and the fourth sidewall 16 are connected end-to-end and interconnected between the front wall 13 and the rear wall 14. The first sidewall 11, the second sidewall 12, the front wall 13, the rear wall 14, the third sidewall 15, and the fourth sidewall 16 cooperatively form a cavity 10a.

An opening 130 is defined in the front wall 13 and communicates with the cavity 10a. That is, the housing 10 has an open end at the front wall 13 and a closed end at the rear wall 14 opposite to the open end. A number of light output holes 150 are defined in the third sidewall 15 and communicate with the cavity 10a. In this embodiment, the light output holes 150 are arranged in a line along the longitudinal direction of the third sidewall 15, and a distance between each two neighboring light output holes 150 is about 3 millimeters (mm) Each of the light output holes 150 is elongated and rectangular, and the width of each of the light output holes 150 is about 0.1 mm.

The reflective film 20 is formed on entire inner side surface (not labeled) of the housing 10 in the cavity 10a. The reflective film 20 is configured to repeatedly reflect light entering the cavity 10a from the opening 130.

The light source 200 is arranged in front of the front wall 13 and aligned with the opening 130. In this embodiment, the light source 200 is an LED.

The light guide plate 300 includes a light incident surface 302 and a light output surface 304 perpendicularly connected to the light incident surface 302. The light incident surface 302 faces the light output holes 150.

When in use, light emitted from the light source 200 enters the cavity 10a from the opening 130, and is then repeatedly reflected by the reflective film 200 in the cavity 10a, and exits the housing 10 through the light output holes 150 to enter the light guide plate 300 through the light incident surface 302, and is finally reflected inside the light guide plate 300 and emitted from the light output surface 304.

In the backlight module 400, the light guide element 100 can diffuse the light emitted from the light source 200. That is, the backlight module 400 can use fewer LEDs while obtaining a larger light emitting area. This decreases costs and improves performance Furthermore, the light passed through the light guide element 100 becomes more uniform and bright due to the distance between every two neighboring light output holes 150 being about 3 mm, and the width of each of the light output holes 150 being about 0.1 mm.

Even though numerous characteristics and advantages of the present embodiments have been set fourth in the foregoing description, together with details of the structures and functions of the embodiments, the disclosure is illustrative only, and changes may be made in details, especially in matters of shape, size, and the arrangement of parts within the principles of the disclosure to the full extent indicated by the broad general meaning of the terms in which the appended claims are expressed.

What is claimed is:

1. A light guide element comprising:
   a hollow housing defining a cavity, the housing comprising a front wall with an opening, a closed rear wall opposite to the front wall, and four sidewalls interconnected between the front wall and the rear wall, one of the sidewalls defining a plurality of light output holes, the opening and the light output holes communicating with the cavity; and
   a reflective film formed on the entirely inner side surfaces of the housing in the cavity, whereby light from the opening is repeatedly reflected by the reflective film in the cavity and finally exits the housing through the light output holes.

2. The light guide element as claimed in claim 1, wherein the light output holes are arranged in a line along the longitudinal direction of the sidewall.

3. The light guide element as claimed in claim 2, wherein a distance between each two neighboring light output holes is about 3 millimeters.

4. The light guide element as claimed in claim 3, wherein each of the light output holes is rectangular, and the width of each of the light output holes is about 0.1 millimeters.

5. The light guide element as claimed in claim 4, wherein the sidewalls comprise a first sidewall, a second sidewall, a third sidewall, and a fourth sidewall, the first sidewall, the third sidewall, the second sidewall, and the fourth sidewall are perpendicularly connected end-to-end and interconnected between the front wall and the rear wall.

6. A backlight module comprising:
   a light guide element comprising:
      a hollow housing defining a cavity, the housing comprising a front wall with an opening, a closed rear wall opposite to the front wall, and four sidewalls interconnected between the front wall and the rear wall, one of the sidewalls defining a plurality of light output holes, the opening and the light output holes communicating with the cavity; and a reflective film formed on the entirely inner side surfaces of the housing in the cavity;

a light source aligned with the opening; and a light guide plate comprising a light incident surface facing the light output holes and a light output surface perpendicular connected to the light incident surface, whereby light from the opening is repeatedly reflected by the reflective film in the cavity, and then exits the housing through the light output holes to enter the light guide plate through the light incident surface thereof, and finally exits from the light output surface.

7. The backlight module as claimed in claim 6, wherein the light output holes are arranged in a line along the longitudinal direction of the sidewall.

8. The backlight module as claimed in claim 7, wherein a distance between each two neighboring light output holes is about 3 millimeters.

9. The backlight module as claimed in claim 8, wherein each of the light output holes is rectangular, and the width of each of the light output holes is about 0.1 millimeters.

10. The backlight module as claimed in claim 9, wherein the sidewalls comprise a first sidewall, a second sidewall, a third sidewall, and a fourth sidewall, the first sidewall, the third sidewall, the second sidewall, and the fourth sidewall are perpendicularly connected end-to-end and interconnected between the front wall and the rear wall.

* * * * *